United States Patent [19]

Wu

[11] Patent Number: 5,413,261
[45] Date of Patent: May 9, 1995

[54] SAFE DETACHABLE BAND FOR A CHILD'S WATER BOTTLE

[75] Inventor: Hua-Te Wu, Tainan, Taiwan, Prov. of China

[73] Assignee: Yienn Lih Enterprise Co., Ltd., Tainan, Taiwan, Prov. of China

[21] Appl. No.: 170,813

[22] Filed: Dec. 21, 1993

[51] Int. Cl.6 ............................................. A45F 3/14
[52] U.S. Cl. .................................. 224/148; 224/202; 215/396; 294/31.2
[58] Field of Search ............... 224/148, 202, 257, 258; 215/100 A; 248/102; 294/31.2; 24/115 F, 602, 625, 623

[56] References Cited

U.S. PATENT DOCUMENTS

| D. 256,652 | 9/1980 | Leung et al. | 224/148 |
| 905,456 | 12/1908 | Raymond | 24/623 |
| 1,890,482 | 12/1932 | Weissberg | 215/100 A |
| 2,759,756 | 8/1956 | Sikora | 294/31.2 |
| 3,093,257 | 6/1963 | Miller | 274/31.2 |
| 5,027,477 | 7/1991 | Seron | 24/602 |
| 5,167,354 | 12/1992 | Cohanfard | 224/148 |
| 5,203,481 | 4/1993 | Dobbins et al. | 224/257 |
| 5,244,135 | 9/1993 | Nelson | 24/602 |

Primary Examiner—Linda J. Sholl
Attorney, Agent, or Firm—Morton J. Rosenberg; David I. Klein

[57] ABSTRACT

A safe and detachable band for a child's water bottle has a band with two ends each connected with a fitting pin separably engaging with two holes in two semi-circular projections of a hitching ring fitting around the bottle body under an annular projecting edge thereon. The hitching ring has a hook in each of the two opposite semi-circular projections to separably hook the annular projecting edge of the bottle body.

1 Claim, 3 Drawing Sheets

SAFE DETACHABLE BAND FOR A CHILD'S WATER BOTTLE

BACKGROUND OF THE INVENTION

A common conventional child's water bottle shown in FIG. 4 generally has a very strong band for hanging a bottle body on a shoulder or a neck of a user. And the band is firmly combined with the bottle body, impossible to be separated from the bottle body. So if a child uses it, hanging on his shoulder, there may happen an accident that the band may wind around his neck forcibly by playing fun of the bottle body by another child. And chances are that the band may be hooked by a branch of a tree, if the user goes by the tree.

SUMMARY OF THE INVENTION

This invention has been devised to have the following desirable advantages:

1. A band can endure a certain force, unseparable from the bottle body within the certain force when the band should be pulled.
2. Even if the band should be wound around a neck of a user and be pulled with a large force beyond the certain force, it could separate from the bottle body, with two fitting pins connected with the two band ends possible to be freed from two holes of a hitching ring; if the bottle body is kept in a reversed position and should be pulled with a large force, two hooks of the hitching ring might unhook from an annular projecting edge of the bottle body, allowing the band separate from the bottle body as well, causing no danger to the user.
3. The band can be combined with the bottle body with great easiness, by inserting the fitting pins through two holes in two semi-circular projections of the hitching ring.

BRIEF DESCRIPTION OF DRAWINGS

The invention will be better understood by reference to the accompanying drawing, wherein.

DESCRIPTION OF THE PREFERRED EMBODIMENTS

Figure 2:
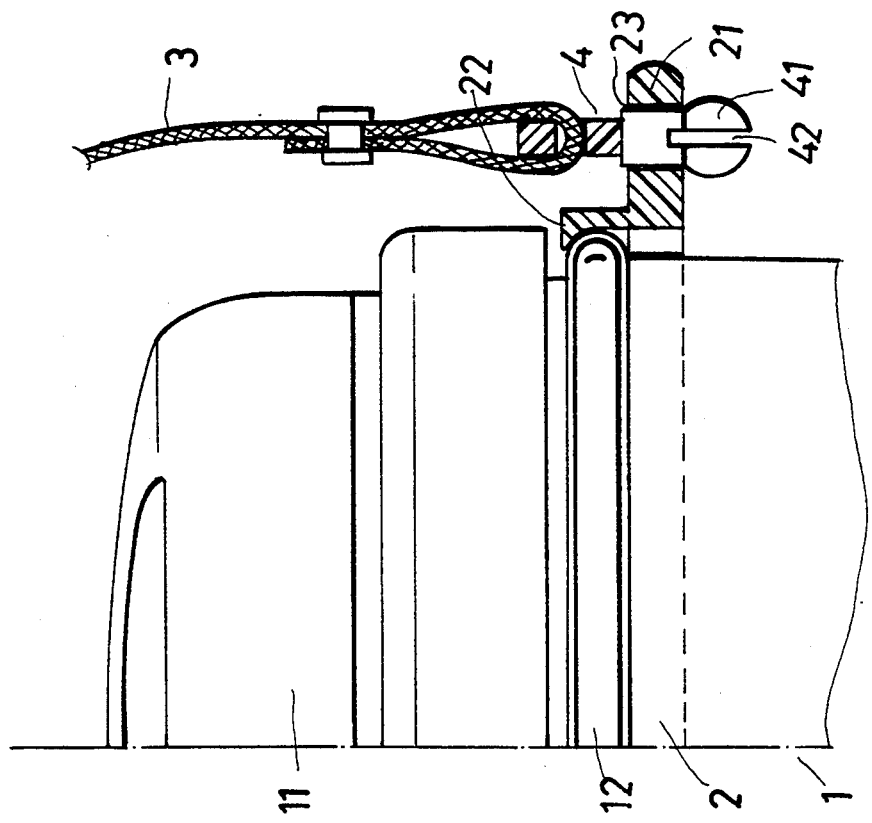
FIG. 2 is a side cross-sectional view of the safe detachable band for a child's water bottle in the present invention, being connected with a water bottle.
Figure 1:
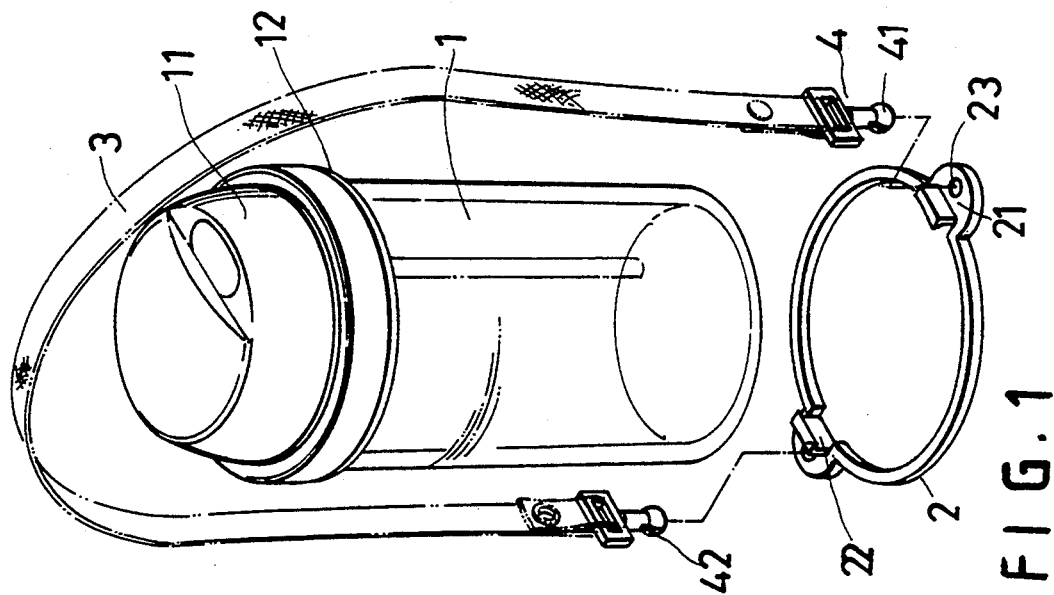
FIG. 1 is an exploded perspective view of a safe detachable band for a child's water bottle in the present invention.

A safe detachable band for a child's water bottle in the present invention, as shown in FIG. 1, includes a hitching ring 2 and a band 3 combined with a bottle body 1.

The bottle body 1 has a cap 11, and an annular projecting-edge 12 in an upper portion under the cap 11.

The hitching ring 2 has two opposite semi-circular projections 21, 21 each provided with a hole 23 and an upright hook 22 to hook the annular projecting edge 12 of the bottle body 1.

The band 3 of a proper length for hanging on a shoulder or a neck of a user has both ends each connected with a fitting pin 4, which has a lower end formed as a spherical ball 41 cut with a diametrical vertical slot 42 into two half portions, which may be compressed against each other.

In combining the hitching ring 2 and the band 3 with the bottle body 1, first, the hitching ring 2 is inserted around the bottle body from bottom and moved up to the annular projecting edge 12 to hook the upright hooks 22, 22 with the annular edge 12 of the bottle body 1. Then the spherical balls 41, 41 are held with the two half portions divided by the slot 42 compressed to become a little smaller and then inserted through down the holes 23, 23 of the hitching ring 2. After the balls 41, 41 pass through the holes 23, 23, the two half portions recover their original position, making the diameter of the balls 41, 41 a little larger than that of the holes 23, 23. Then the fitting pins 4, 4 with the band 3 are kept constantly connected with the hitching rings 2, without separating from each other.

Provided that the band 3 is pulled with a large force, the two spherical balls 41, 41 of the fitting pins 4, 4 will separate from the holes 23, 23 of the hitching ring 2, permitting the band 3 separate from the bottle body 1.

Figure 3:
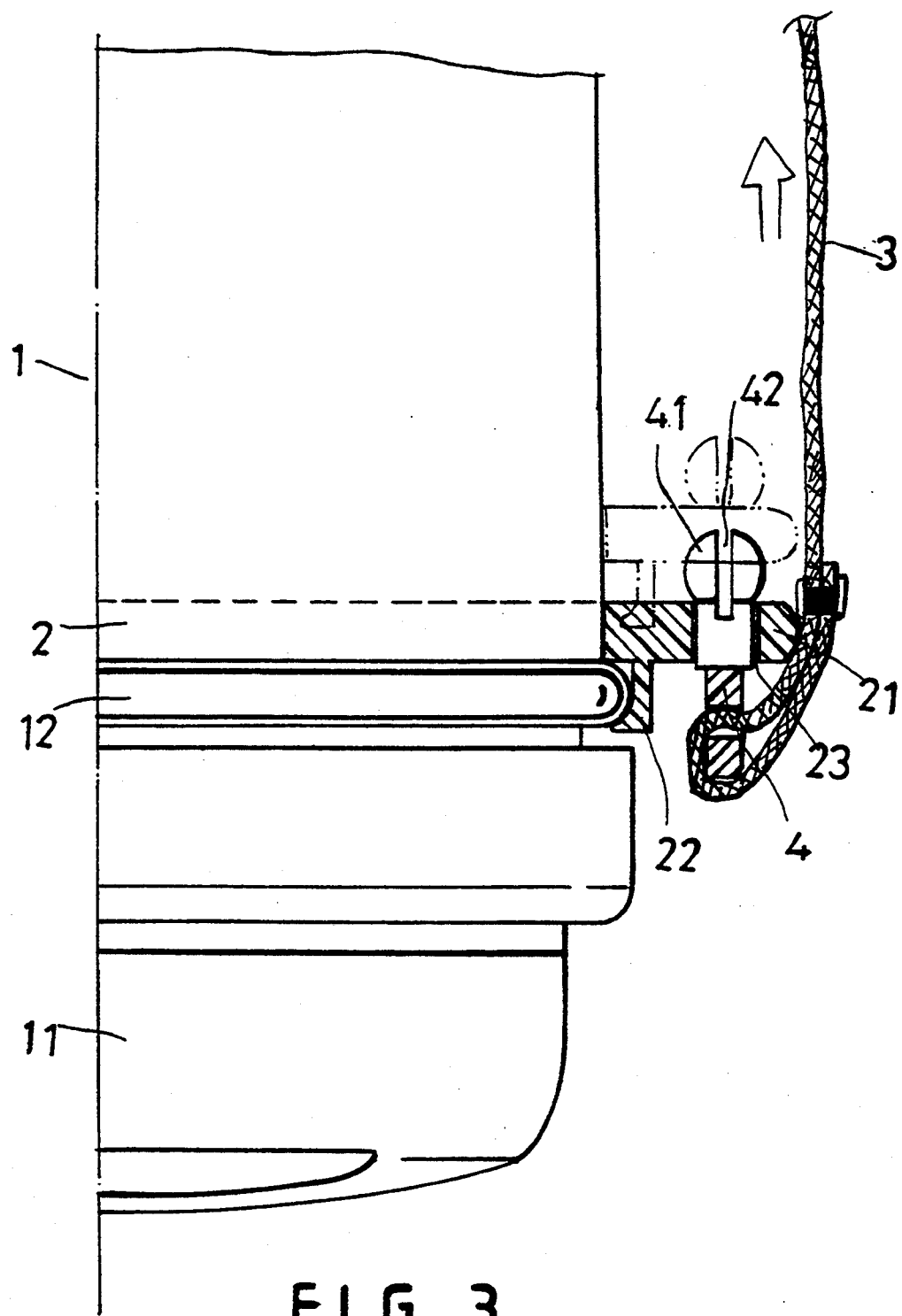
FIG. 3 is a cross-sectional view of the safe detachable band for a child's water bottle in the present invention, showing a reversed position of the bottle body with the band; and, FIG. 4 is a perspective view of a conventional water bottle with a band.
Figure 4:
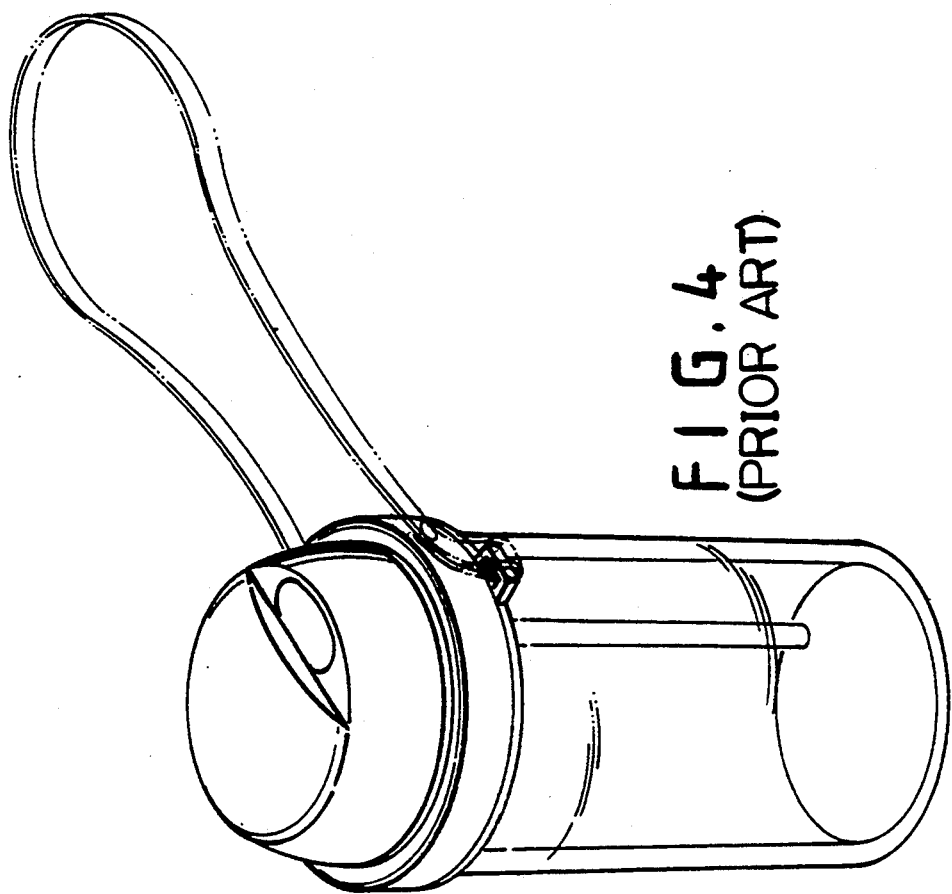

In case the bottle body 1 is kept in a reversed position and the bottle body 1 is pulled with a large force, as shown in FIG. 3, the hooks 22, 22 of the hitching ring 2 will unhook from the annular projecting edge 12, letting the band 3 separate from the bottle body 1. Therefore, a user may not be harmed by the band 3 hung on a neck of the user.

While the preferred embodiments of the invention have been described above, it will be recognized and understood that various modifications may be made therein and the appended claims are intended to cover all such modifications which may fall within the spirit and scope of the invention.

What is claimed is:

1. A bottle safety band system comprising:
   (a) a bottle having an annular edge member formed on an upper section of said bottle;
   (b) a cap member removably secured to said upper section of said bottle, said cap member and said annular edge member forming an annular recess therebetween when said cap member is secured to said bottle;
   (c) a hitching ring member having an annular contour for displaceable mounting on a sidewall of said bottle, said hitching ring member having a pair of diametrically opposed semi-circularly contoured projections extending therefrom, each of said semi-circularly contoured projections having a projection opening passing therethrough and a hook member extending therefrom for insert into said annular recess between said annular edge member and said cap member;
   (d) a band member having opposing end sections; and,
   (e) a pair of fitting pins respectively coupled to said opposing end sections of said band member, each of said fitting pins having a downwardly extending ball member, each of said ball members having a vertically directed slot formed therein forming a pair of ball member half portions whereby said ball member half portions may be inserted through a respective one of said projection openings when said half portions are displaced toward each other and whereby said hook members are released from said annular recess when a predetermined force is applied to said band member.

* * * * *